Feb. 12, 1935.     D. H. FORBES     1,990,937
RUBBER ARTICLE AND METHOD OF PRODUCING THE SAME
Filed Aug. 18, 1932
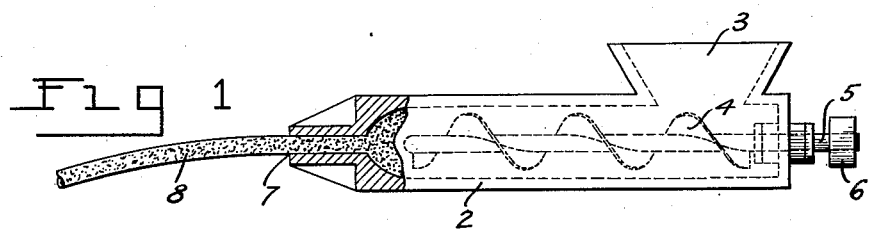
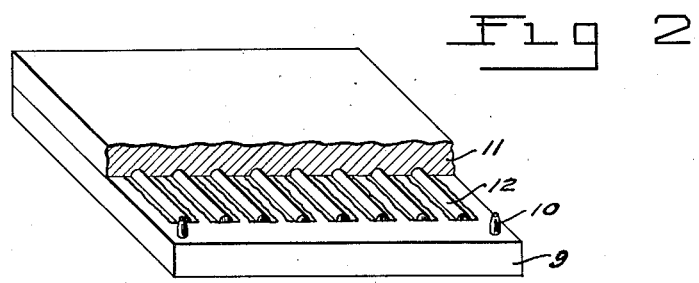
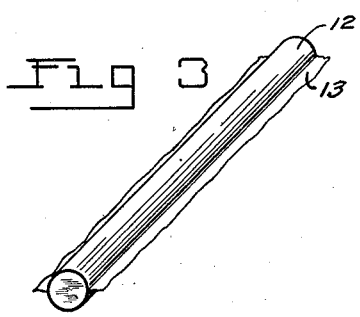
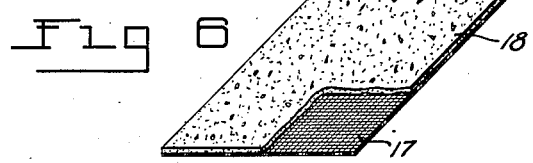
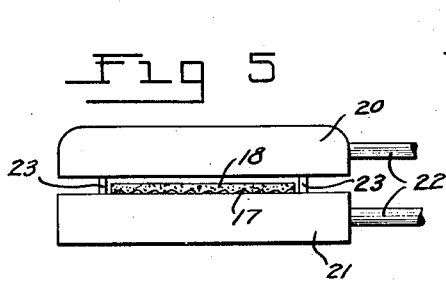
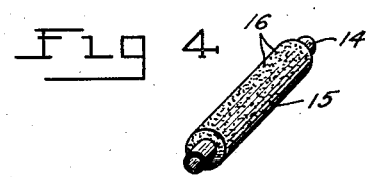
Inventor
David H. Forbes
by
Walter J. Kaufman
Attorney Patented Feb. 12, 1935

1,990,937

UNITED STATES PATENT OFFICE 1,990,937

RUBBER ARTICLE AND METHOD OF PRODUCING THE SAME

David H. Forbes, Lancaster, Pa., assignor to Armstrong Cork Company, Lancaster, Pa., a corporation of Pennsylvania Application August 18, 1932, Serial No. 629,280

16 Claims. (Cl. 18—53)

This invention relates to rubber articles and to a process of manufacturing rubber articles and is particularly directed to the manufacture of a cork and sponge rubber composition having new and desirable properties not heretofore obtained.

This application is a continuation in part of my co-pending application, Serial No. 548,373, filed July 2, 1931.

It has been heretofore proposed to make a composition of matter by embodying cork in ordinary vulcanized rubber, but the cork particles have been provided in such cases primarily for the purpose of obtaining resilience. The cork particles are disposed interiorly of the body and function only elastically. I have found that unexpectedly desirable frictional qualities are obtained by embedding cork particles in a body of sponge rubber. Preferably the body thus formed has a smooth surface with particles of cork exposed; the surface being preferably one having the characteristics of a cut surface formed by dividing a mass of the material or removing the initial surface thereof as by grinding. Such surface will ordinarily be plane and will have the surface of cork particles lying therein. These surfaces will not be coated by rubber but will have been formed by the severence of cork granules. Sponge rubber is known to have desirable frictional qualities and this is also true of cork, but by employing the combination as above described, markedly improved results are obtained. I believe this to be due to the manner of support of the cork particles. The sponge rubber is relatively more yieldable than such particles and the pressure of the body against another article probably causes the surface to depart somewhat from its original plane, the action being that when pressure is applied, the sponge rubber around the particles is compressed more than are the particles themselves, so that the small cork granules are slightly upstanding. In addition to this there may be some tilting of the cork granules upon relative movement of the composition in the body with which it is in engagement.

I do not limit myself to the theories thus expressed, but, at any rate, the material as above stated has an unexpectedly high co-efficient of friction. In addition to this, it is very durable and maintains its desirable qualities over an extended period of time. Many friction bodies tend to harden or oxidize with age, but the composition which I employ is relatively free from this defect. In addition, the surface shows little or no tendency to fill or glaze.

I will describe my invention with particular reference to the manufacture of friction rollers and laminated sheets such as floor coverings, but it will be understood that other articles may be produced according to my invention.

In the accompanying drawing illustrating a preferred embodiment of my invention;

Figure 1 is a more or less diagrammatic view illustrating an extrusion press suitable for use with my invention;

Figure 2 is an oblique view, partly broken away, which shows a two piece mold containing a plurality of molded pieces;

Figure 3 illustrates one of the molded pieces after removal from the mold;

Figure 4 is an oblique view and illustrates a completed friction roller;

Figure 5 is a diagrammatic view illustrating a laminated sheet in a platen vulcanizing press prior to vulcanization; and Figure 6 is an oblique view partly broken away, illustrating a completed laminated sheet.

I will first describe my invention with reference to the manufacture of a friction roller using the following composition. All of the proportions are given by weight.

| | Parts |
|---|---|
| Pale crepe rubber | 320 |
| Cork | 160 |
| Tetramethylthiuramdisulphide | 3 |
| Zinc | 16 |
| Petrolatum | 16 |
| Stearic acid | 16 |
| Sulphur | 8 |
| Mercaptobenzothiazole | 3 |
| Litharge | 3 |
| Anti-oxidant | 8 |
| Bicarbonate of soda | 40 |

The pale crepe rubber is placed in a tight rubber mill and milled for approximately 30 minutes. The petrolatum, which acts as a softening agent, is then added to the rubber and thoroughly mixed in. The stearic acid, zinc, the anti-oxidant and the vulcanizing agents are then added and thoroughly mixed. The stearic acid acts as a neutralizer and also assists in dispersion. The zinc is an activator. Sulphur is, of course, the vulcanizing agent. The accelerators are the tetramethylthiuramdisulphide and mercaptobenzothiazole. I prefer that the accelerators which are used are so proportioned and of such character that they are effective after the blowing action is substantially completed. In order to obtain a uniform cell structure, it is necessary that vulcanization proceed after the blowing rapidly enough to inhibit migration of the gas and the formation of non-uniform gas pockets from combining cells. The litharge acts as a controlling factor. It retards the vulcanizing up to 220° F. and thereafter acts as an accelerator. If any coloring matter is desired, it is also added at this time. These several components having been thoroughly milled together, the blowing agent, namely, bicarbonate of soda is added and thoroughly incorporated in the mix. The cork is added last. During the milling considerable heat is generated and there may be a tendency to scorch the cork or cause the resins to exude therefrom, and for this reason as much of the milling as possible is carried out before the addition of the cork.

I prefer that the mix be then allowed to stand for a period of 24 hours as this permits the bicarbonate of soda and the accelerators to become thoroughly distributed through the mix. After standing, the material may be remilled, although this is not essential. Remilling, however, gives a more uniform structure.

In order to facilitate molding, the cork and rubber mix is preferably pre-formed to approximately the desired final shape. In the manufacture of cylindrical friction rollers the material may be conveniently formed by extrusion. An extrusion press suitable for this purpose is diagrammatically illustrated in Figure 1. This press comprises an outer shell 2, which is preferably provided with a steam or water jacket. A hopper 3 is provided for the reception of the mix. The screw conveyor 4, provided with a shaft 5 to which is secured a driving pulley 6, is driven by a suitable power source, not shown. At the beginning of the extruding operation, steam is applied to the jacket in order to heat the mix and permit ready extrusion. After the machine has been in operation for a short time, sufficient frictional heat is developed so that the steam may be cut off and if necessary cold water supplied to the jacket in order to prevent any undue rise in temperature. The mix which is fed into the machine is urged forwardly through the orifice 7, which for the production of a cylindrical roll is preferably circular in cross section, by the screw conveyor 4 thus forming a cylindrical blank 8 of circular cross section and indefinite length. The cylindrical blanks 8 are cut into the desired lengths and are placed in molds for vulcanization.

In the production of a finished roll 2″ in diameter, the extruded blank may be 1½″ in diameter. The desired density of the final product determines to some extent the size of the preformed blank which should be used. The internal pressure developed by the blowing action of the bicarbonate of soda is usually sufficient to produce a sufficiently dense product without the use of external pressure applied to the molds. If a light, relatively soft material is desired, the volume of mix placed in the mold may be relatively small as compared with the final volume of sponge rubber-cork product. In other words, the density of the final product can be readily determined by the volume of mix placed in the mold prior to vulcanization and the density may be readily controlled by simply increasing or decreasing the volume of pre-formed mix for each individual cavity. The amount of bicarbonate of soda given in the above example is sufficient to blow the pre-formed mix to about three times its original volume provided the blowing action in the mix is unrestricted. If a more dense product is desired, the die cavities may be filled with the pre-formed blanks and the internal pressure caused by the bicarbonate of soda will produce a relatively dense, microporous structure.

A mold suitable for use with a platen vulcanizing press is illustrated in Figure 2 and comprises a base plate 9 provided with dowel pins 10 which serve to align the top plate 11 with the base plate. Vulcanized pieces 12 are shown in the mold cavities.

I have found that a uniform product having a fine grained cell structure throughout may be obtained if the heat used in the vulcanizing operation is carefully controlled. After the preformed blanks have been placed in the mold cavities, the mold is placed in a suitable vulcanizing press, such as a platen press, and sufficient pressure applied to prevent any undue extrusion of rubber where the base and top plates join. The press platens are heated to about 280° F. and the molds inserted. The temperature is now slowly raised to about 305° F. I have found that by slowly raising the temperature, a fine grained cell structure is obtained which is desirable in friction bodies which must possess some rigidity. If the temperature is rapidly raised, a more or less irregular cell structure results in which the cells are relatively large and non-uniformly distributed. Highly satisfactory results are obtained if the rise from 280° F. to 305° F. consumes about 15 minutes. The temperature is maintained at 305° F. for about 15 or 20 minutes. The vulcanizing time will, of course, depend upon the materials used, the desired hardness of the final product, etc.

The heat of vulcanizing melts down the rubber binder and causes it to become more or less liquid. The bicarbonate of soda evolves as a gas blowing the mass and causing internal pressure which forces the mass into engagement with the surface of the mold cavity. The binder, being relatively liquid at vulcanizing temperatures, flows over the cork particles and completely covers them. There is also some tendency for the rubber composition to flow at the joint between the base and face plates of the mold. As the vulcanizing continues the product becomes solid.

After vulcanizing, the pieces are removed from the molds and the outer covering or skin of rubber is removed in order to expose the cork granules and produce a cellular exterior surface of cork and rubber. A molded cylindrical piece is illustrated in Figure 3. The flash is indicated at 13. In order to remove the flash as well as the outer layer of rubber, I have found that a centerless grinding machine may be conveniently used. The grinding wheels are set at the proper distance and the molded pieces are fed through and ground to the desired size thus producing a cylindrical blank which exhibits on the periphery a multiplicity of several cork granules held in a matrix of sponge rubber.

In Figure 4 there is illustrated a completed frictional roller such as might be used as a paper guide for typewriting machines. This roller comprises a cylindrical shaft or stud 14 to which the cork and sponge rubber covering 15 is secured. A suitable adhesive may be interposed or the cork and sponge rubber held to the stud simply by frictional engagement. The exposed cut or ground cork granules are indicated at 16.

If desired, the cork and sponge rubber composition may be molded directly to the stud after which the outer surface of rubber is removed by cutting or grinding to produce the desired final frictional surface. In most cases, however, I prefer to cut the finished ground blank to the desired size and thereafter punch or drill a hole suitable for the reception of the stud. It is also possible to first punch the blank and thereafter insert the stud and grind the outer surface.

The rolls may advantageously contain cork particles in sizes ranging from 20 to 40 mesh screen. If the roll is to be used for heavy service such as a platen roll for calculating machines, the cork particles may be somewhat larger and have a smaller range in size. The softness of the composition will depend to some extent upon the fineness of the cork particles. In all cases, it is usually desirable to keep "fines" out of the cork and use "granular" cork, that is, cork particles ranging in size from one screen through which it will pass to another screen through which it will not pass but which will pass the finer granules and dust. The presence of "fines" in the composition increases its density, gives a somewhat harder friction surface and diminishes the resistance of the surface to glazing.

In Figures 5 and 6, I have illustrated a laminated sheet comprising a backing layer 17 such as open mesh fabric, for example Osnaberg sheeting, and a surface layer 18 of cork and sponge rubber which is preferably provided with a cut or ground face which provides a multiplicity of exposed cork granules 19. The mix used in the production of sheets of this type is prepared similar to that above described for the production of friction rollers. After remilling the material is fed to a 3-roll calender. The fabric backing material is run between the second and third roll of this calender. The cork and sponge rubber mix is applied between the first and second rolls for milling and the sheet of mix thus formed is led over the second roll to the fabric. For the production of a sheet, let us say $\frac{3}{32}$" thick, a layer of cork and rubber composition approximately $\frac{1}{16}$" thick is calendered onto the backing 17. The material is then vulcanized. A heated drum type continuous vulcanizer may be used or a platen press may be substituted, although it does not permit of as rapid production of continuous sheets. In Figure 5, I have diagrammatically illustrated a platen vulcanizing press suitable for this purpose. This press comprises essentially a pair of shell type platens 20 and 21 provided with steam inlets 22.

In vulcanizing sheets of this type, it is desirable to allow the mix to blow quite freely in order to obtain a porous structure. For that reason spacer plates 23 are provided which space the platens 20 and 21 a pre-determined distance from each other. When a sheet $\frac{3}{32}$" in final thickness is to be made the platens may be spaced about $\frac{1}{8}$" apart. Both of the platens are heated to about 287° F. The webs are intermittently advanced under the platens and the heat causes the rubber to melt down. The bicarbonate of soda blows the mass into a porous web, and after sufficient heating the material becomes vulcanized, returning to a final solid state. The vulcanization of a $\frac{1}{8}$" sheet may be effected in about 10 minutes. As in the molding of cylindrical bodies the outer surface of the mix is in the form of a skin or surface layer of rubber which must be removed if it is desired to have a cork and rubber friction surface. The sheets may be reduced to final thickness by means of a slicing machine such, for example, as a leather slitter or the outer skin may be ground. This exposes small areas of cork, as above described, and removes any gloss which may be on the surface by reason of the molding process. In this manner the most desirable frictional qualities of the material are obtained. As pointed out above, it is desirable to have exposed particles of cork held in a matrix of relatively resilient and deformable sponge rubber.

While I have described my invention with particular reference to the production of friction rollers and laminated sheets the material may be made into the form of sheets or otherwise and may be employed as friction pads, isolation pads for small motors or the like, floor coverings, table coverings, frictional base pads for telephones, table lamps or the like, or for generally, wherever it is desired to have a material having an extremely high frictional co-efficient and yielding body. If desired, the material may be made in sheet form without the use of a fabric backing.

Various other chemicals may be substituted for those above disclosed. For example, diphenylguanadine may be used in the compound in place of mercaptobenzothiazole. Other accelerators, such as trimene, piperidenepentamethylenedithiocarbamate or any thiruam base accelerator may be used if properly proportioned. Zinc stearate may be used in place of zinc as an activator. Palm oil, paraffin, or Burgundy pitch may be used as softeners instead of petrolatum, the Burgundy pitch being used if a tacky mix is desired. Stearic acid, which is set forth in the specific example above, acts as a neutralizer and assists in the dispersion of the compound. Oleic acid may be used in place of stearic acid as a neutralizer.

It is desirable to employ a blowing agent which will give a good cell structure. I prefer that the cells be relatively small and uniform in size. The holding of the material for approximately a day's time after milling before the compound is employed is helpful in this particular. The bicarbonate of soda has been found in practice to be a desirable blowing agent, but ammonium bicarbonate or other blowing agents may be employed.

I have illustrated a present preferred embodiment of the invention and stated certain compositions which may be employed. It will be understood, however, that they are by way of example only, and that the invention may be otherwise embodied or practiced within the scope of the following claims.

I claim:

1. In a process for the manufacture of cork and sponge rubber articles, the steps consisting in milling together a rubber binder, a vulcanizing agent and a blowing compound decomposible under heat to evolve a gas and after milling is substantially completed mixing in granulated cork without substantial reduction in granule size of the cork to form a homogeneous mixture, shaping the mix and blowing and vulcanizing the same.

2. In a process for the manufacture of cork and sponge rubber articles, the steps consisting in forming a milled mixture including rubber, a vulcanizing agent, a blowing compound decomposible under heat to evolve a gas and granulated cork, cooling the material slowly by exposure to the atmosphere, thereafter remilling the mass without materially reducing the size of the cork granules, blowing and vulcanizing the same.

3. In a process for the manufacture of cork and sponge rubber articles, the steps consisting in milling together a rubber binder, a vulcanizing agent and a blowing compound decomposible under heat to evolve a gas after milling is substantially completed mixing in granulated cork and forming a homogeneous mixture without substantial reduction in granule size of the cork, cooling the material, thereafter blowing and vulcanizing the same, and cutting the article to form a surface of porous rubber and cut cork granules embedded therein.

4. In a process for the manufacture of cork and sponge rubber articles, the steps consisting in milling together a rubber binder, a vulcanizing agent and a blowing compound decomposible under heat to evolve a gas after milling is substantially completed, mixing in granulated cork and forming a homogeneous mixture substantially free of cork fines, cooling the material, thereafter remilling the mass, blowing and vulcanizing the same.

5. In a process for the manufacture of cork and sponge rubber articles, the steps consisting in milling a mass including rubber, a vulcanizing agent and a blowing compound decomposible under heat to evolve a gas, adding granulated cork to the mixture without substantial reduction in granule size of the cork while continuing milling, forming a homogeneous mixture, permitting the mass to stand for at least approximately 12 hours, and thereafter remilling the mass and simultaneously blowing, shaping and vulcanizing the same.

6. In a process for the manufacture of cork and sponge rubber articles, the steps consisting in milling together a mass including rubber, a vulcanizing agent, a blowing compound decomposible under heat to evolve a gas after milling is substantially completed mixing in a major portion by volume of granulated cork distributing said granulated cork through said rubber mass without substantial reduction in granule size of the cork, forming said mass into approximately the desired final shape, placing said preformed mass in initially unrestricted condition in a mold and thereafter blowing the mass, shaping and vulcanizing the same.

7. In a process for the manufacture of cork and sponge rubber articles, the steps consisting in milling a mass including pale crepe rubber, a vulcanizing agent, a blowing compound decomposible under heat to evolve a gas, and an accelerator which becomes effective at a temperature higher than the temperature at which the blowing agent gasifies, after milling is substantially completed milling into said mass a major portion by volume of granulated cork from which the fines have been removed without substantial reduction in granule size of the cork, permitting the mass to cool, remilling the mass, preforming said mass and thereafter blowing and vulcanizing the same by gradually heating to cause gasifying of the blowing agent and vulcanizing after the blowing is substantially complete.

8. In a process for the manufacture of cork and sponge rubber articles, the steps consisting in milling together approximately 320 parts by weight of pale crepe rubber, 8 parts by weight of sulphur and 40 parts by weight of bicarbonate of soda together with effective amounts of accelerator, anti-oxidant and softening agent, adding 160 parts by weight of granulated cork, further milling the mass to form a homogeneous mixture without substantially reducing the granule size of the cork, cooling the mass to permit the bicarbonate of soda and the accelerator to become better distributed through the mix, and thereafter blowing and vulcanizing the mass.

9. In a process for the manufacture of cork and sponge rubber articles, the steps consisting in milling together a rubber binder, a vulcanizing agent, a blowing compound decomposible under heat to evolve a gas, an accelerator which becomes effective at a temperature higher than the temperature at which the blowing agent gasifies, after milling is substantially completed mixing in a major portion by volume of granulated cork; cooling the material; thereafter calendering said material upon a backing; blowing and vulcanizing the same.

10. A cork and sponge rubber article comprising a vulcanized rubber binder substantially free of unblown constituents characterized by a cellular structure and having particles of granulated cork distributed therethrough, the cork being substantially free from fines and being present in greater proportion than the rubber by volume.

11. A cork and sponge rubber article adapted for use as friction material comprising a vulcanized rubber binder characterized by a cellular structure and having particles of granulated cork distributed therethrough, the cork being present in greater proportion than the rubber by volume and being exposed at the friction surface.

12. In a process for the manufacture of cork and sponge rubber articles having a friction surface, the steps consisting in milling a mass including a rubber binder, a vulcanizing agent and a blowing compound decomposible under heat to evolve a gas while maintaining the temperature of said mass below that at which the blowing agent decomposes, distributing said rubber binder over a major portion by volume of granulated cork without substantially reducing the granule size of said cork, permitting the mass to cool, whereby migration of the blowing compound and vulcanizing agent is effected, redistributing the vulcanizing agent and blowing compound throughout the mass by remilling, preforming said mass into approximately the desired final shape and placing the same in initially unrestricted condition in a mold, gradually heating the mold to cause decomposition of the blowing agent, vulcanizing after blowing is substantially completed and cutting the molded article to form a friction surface of porous rubber and cork granules embedded therein.

13. As a new article of manufacture, a friction roller comprising a vulcanized sponge rubber binder, particles of granulated cork distributed therethrough in substantially uncompressed condition and firmly secured in the rubber matrix, the roller having a surface characteristic of a cut body with some of the cork granules terminating in such surface.

14. As a new article of manufacture, an isolation pad comprising a vulcanized rubber binder characterized by a cellular structure and particles of granulated cork distributed therethrough in substantially uncompressed condition and firmly secured in the rubber matrix, the cork being present in greater proportion than rubber by volume.

15. As a new article of manufacture, a cork and sponge rubber article comprising a vulcanized rubber binder characterized by a cellular structure, a major portion by volume of granulated cork, substantially free from fines, distributed therethrough, said element having a substantially smooth surface and presenting cut cork granules.

16. As a new article of manufacture, a friction roller comprising a vulcanized sponge rubber binder substantially free from unblown constituents, characterized by a cellular structure, and particles of granulated cork distributed therethrough in substantially uncompressed condition, the cork being substantially free from fines and being present in greater proportion than the rubber by volume, the roller having a surface characteristic of a cut body with some of the cork granules terminating in such surface.

DAVID H. FORBES.